Patented July 4, 1933

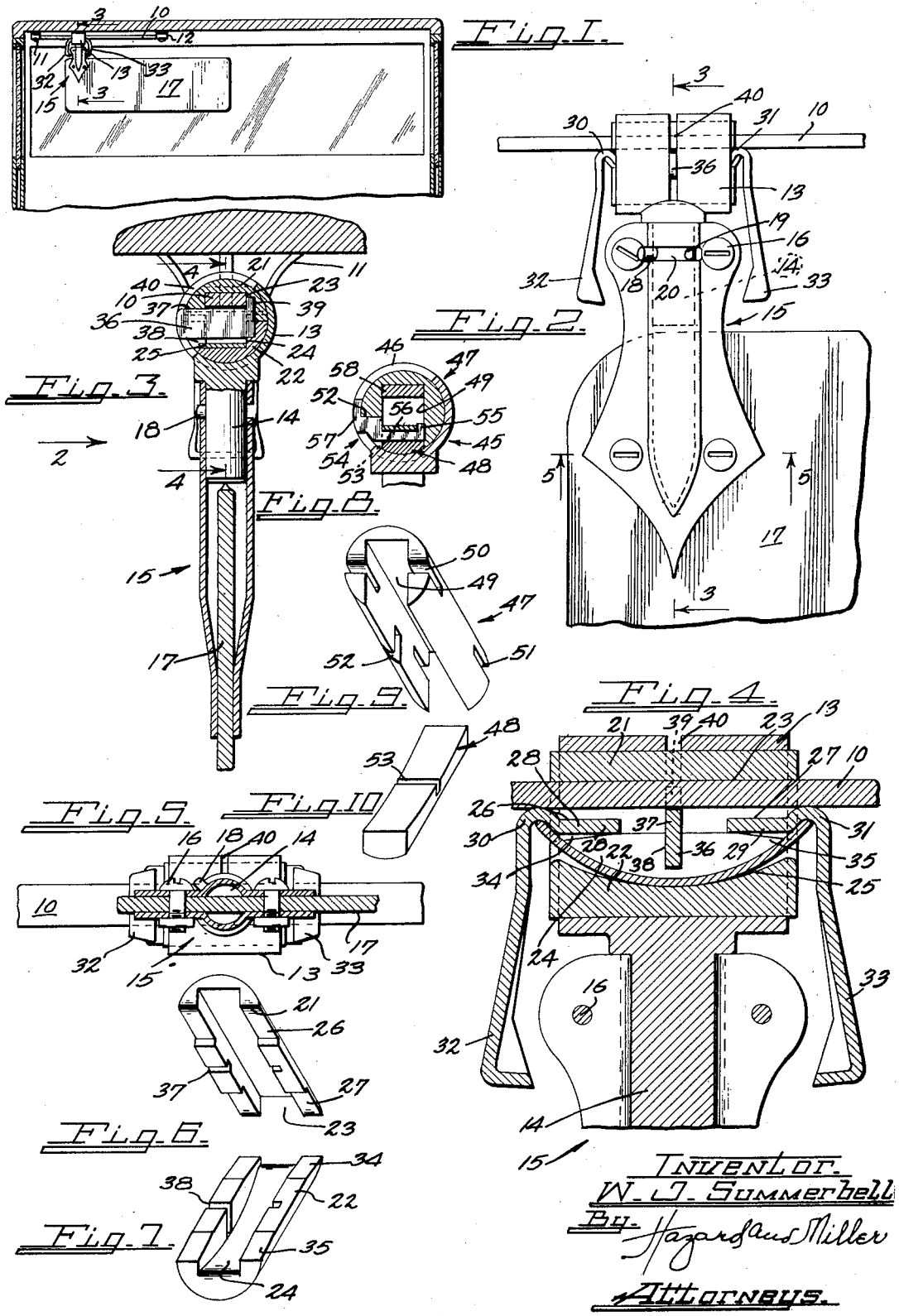
July 4, 1933. W. J. SUMMERBELL 1,916,499
GLARE SHIELD
Filed July 6, 1932

1,916,499

UNITED STATES PATENT OFFICE

WILLIAM J. SUMMERBELL, OF LOS ANGELES, CALIFORNIA

GLARE SHIELD

Application filed July 6, 1932. Serial No. 621,047.

This invention relates to improvements in glare shields and may be considered as an improvement over the construction disclosed in my pending application Serial No. 567,879, filed October 9, 1931.

An object of the present invention is to provide a glare shield having a track and a shield with an improved construction for fastening or mounting the shield on the track, enabling the shield to be either adjusted along the length of the track or to be swung about the track to swing it into an upper position where it is inoperative, or to be swung about a vertical axis, so that the same shield may effectively shield the driver of an automobile from light rays reaching him from the side.

More specifically an object of the invention is to provide an improved construction for mounting the shield on the track which is of extremely simple design facilitating manufacture and assembly and which will effectively hold the shield in any of its adjusted positions, at the same time facilitating easy adjustment.

With the foregoing and other objects in view, which will be made manifest in the following detailed description, and specifically pointed out in the appended claims, reference is had to the accompanying drawing for an illustrative embodiment of the invention, wherein:

Fig. 1 is a section through an automobile illustrating the improved glare shield in applied position therein.

Fig. 2 is a view in elevation of the attaching or mounting means for mounting the shield on the track.

Fig. 3 is a vertical section taken substantially upon the line 3—3 upon Figure 2.

Fig. 4 is a vertical section taken substantially upon the line 4—4 upon Figure 3.

Fig. 5 is a horizontal section taken substantially upon the line 5—5 upon Figure 2.

Fig. 6 is a perspective view of one of the parts of the sectional bushing constituting a part of the mounting means.

Fig. 7 is a perspective view of the opposite part of the sectional bushing.

Fig. 8 is a sectional view through the housing and sectional bushing illustrating an alternative form of construction.

Fig. 9 is a perspective view of one part of the alternative sectional bushing.

Fig. 10 is a perspective view of the other part.

Referring to the accompanying drawing, wherein similar reference characters designate similar parts throughout, the track on which the glare shield is mounted is indicated at 10, this being a metallic bar preferably of rectangular cross section and of suitable length. At the ends of the bar there are brackets 11 and 12 by which it may be mounted on the interior of a vehicle such as an automobile. These brackets space the track from the walls of the vehicle. A cylindrical housing 13 is provided which surrounds the track 10, this housing presenting a cylindrical interior surface. Extending downwardly from the housing there is a pin 14 which is received within the upper end of a suitable clamp generally designated at 15. This clamp consists of two opposed parts fastened together as by bolts or rivets indicated at 16. The lower portions of the parts are disposed on opposite sides of the glare shield 17, which may be of opaque material or semi-transparent material, as desired. The centers of the parts of the clamp 15 are bowed outwardly to form a cylindrical opening therebetween which receives pin 14. In the pin there are formed a pair of apertures for the reception of a small stop pin 18. This stop pin is receivable in either of the apertures 19 and extends through a slot 20 formed in the clamp 15. The purpose of this construction is to enable the glare shield 17 to be turned about a vertical axis from the position shown in Figures 1 and 2 between limits, these limits being established by the engagement of the stop pin 18 with the ends of the slot 20. The bolts or rivets 16 firmly hold parts of the clamp 15 in engagement with the opposite sides of pin 14 so that although the glare shield may be turned, it is frictionally held in any adjusted position.

Within the housing 13 there is a sectional bushing, one section being indicated by the reference character 21 and the other section being indicated at 22. These sections each present on their exteriors approximately semi-cylindrical surfaces complementary to the cylindrical surface on the interior of bushing 13. On the section 21 there is formed a longitudinal groove 23 in which the track 10 is disposed. In the opposite section 22 there is likewise formed a longitudinal groove indicated at 24 the bottom of which is preferably curved as indicated in Figure 4 to constitute a seat for an arcuate spring 25. The engaging face of section 21 is recessed back from its ends as indicated at 26 and 27 for the reception of shoes 28 and 29, portions of which are bowed or bent as indicated at 30 and 31 so as to be engageable by and upon the track 10 and to form seats for the ends of spring 25. These shoes carry integral handles 32 and 33. The engaging face of section 22 of the sectional bushing has its ends beveled off as indicated at 34 and 35, this beveling serving to accommodate a slight movement of the shoes 28 and 29 when the handles 32 and 33 are moved toward each other. In the position shown in Figure 4 the spring 25 urges the shoes 28 and 29 into engagement with track 10 and as the shoes bear upon section 21 of the sectional bushing the spring also serves to become effective through the shoes to spread the sections of the bushing within the housing, urging the sections into engagement with the interior of the housing. This engagement between the shoes and the track serves to hold the housing in any adjusted position along the length of the track. However, it is possible to disengage the shoes from the track to enable adjustment of the glare shield and associated structure along the length of the track. This is accomplished by moving the handles 32 and 33 toward each other, the shoes fulcruming at their inner ends on section 21 against the action of the spring 25. In this way the effectiveness of the spring is counteracted so that there is no part of the structure pressing on track 10 to hold the construction in any adjusted position and the entire structure may be caused to slide along the track, the track passing freely through groove 23. On release of the handles the spring returns the shoes into engagement with the track to hold the shield in adjusted position. The expansion of the sections of the bushing within the housing causes the housing to be frictionally held in any adjusted position. The sections of the bushing are maintained in aligned position within the housing by means of a key 36 of L shaped form, as shown in Figure 3. This key is receivable in aligned slots 37 and 38 formed in the opposed faces of the sections 21 and 22 of the sectional bushing. The small lateral end 39 extends laterally beneath the track so that the key is effectively locked in place by the track so that it cannot be removed out of the slots 37 and 38. The outer end of the key extends through a slot 40 in the housing so that although the housing may turn on the bushing the sections of the bushing are held in alignment by the key and the movement of the housing on the bushing is guided by the key moving in slot 40.

In Figures 8, 9 and 10, there is illustrated an alternative form of construction wherein the housing is indicated at 45, having a slot 46 circumferentially thereon. Within this housing there is a sectional bushing, the parts of which are generally designated at 47 and 48. Referring specifically to Figure 9, the part of the sectional bushing indicated at 48 presents a cylindrical outer surface fitting the interior of the bushing. It is longitudinally grooved with a relatively deep groove 49 and at its ends it has notches 50 and 51 for the reception of the shoes which engage the track. These notches or recesses have outwardly diverging sides so that they are somewhat V shaped in form to accommodate the slight movement of the shoes necessary to disengage the shoes from the track when the shoes pivot about their inner ends which are disposed in the inner ends of notches 50 and 51. The shoes employed in this type of construction are identical with shoes 28 and 29 having the bends at 30 and 31 and the integral handles 32 and 33. At about its center it has a transverse slot 52. The opposite side of the bushing or the other sectional part is shown in Figure 10, this part being indicated at 48, and it is equal in length to the length of part 47. Its width is such that it fits snugly in the groove 49. It has a transverse slot 53 adapted to be caused to register with slot 52. A key 54 is provided which is receivable through slots 52 and 53. It has a laterally extending portion 55 which is receivable in a notch formed in a side edge of spring 56. This key also has a finger 57 disposed in groove 46. The track in this form is indicated at 58 and is disposed against one side of groove 49. The spring 56 which urges the shoes into engagement with the track, similar to spring 25, is disposed in the groove and urges section 48 outwardly against the housing and by reaction the opposite section of the bushing is urged into engagement with the housing and the shoes are urged into engagement with the track. The key with its finger 57 in groove 46 guides the rotational movement of the housing with respect to the bushing. It is held in place by the spring 56 which forces the key to the bottom of slot 53. The key cannot be easily withdrawn because of the laterally extending portion 55 bearing in the notch at the center of the spring.

From the above described construction it will be appreciated that the parts of the mounting means, namely the housing and the sections of the sectional bushing, can be easily and quickly manufactured. In assembling the sections 21 and 22 of the bushing are brought together and the spring 25 positioned in groove 24. The sections of the bushing are then inserted in the housing and slots 37 and 38 are caused to align with slot 40. The key 36 is then inserted and the track 10 is slid into groove 23 to lock the key in place. The shoes 28 and 29 can then be caused to slide into the recessed ends of section 21 and when their grooved portions 30 and 31 encounter the ends of the springs 25 the ends will snap in place and thus fasten the shoes against withdrawal, urging the shoes into engagement with the track and causing the sections of the bushing to effectively separate in the housing to frictionally engage the housing. The purpose of having the stop pin 18 receivable in either of the apertures 19 is to enable the glare shield to be reversed with respect to the housing so that the device can be used either for right or left hand drive automobiles. Whenever it is desired to swing the glare shield about a vertical axis from the position shown in Figure 2 to cut off lateral rays, the glare shield may be merely grasped and turned, in which case the clamp merely turns on pin 14. When it is desired to swing the glare shield into an uppermost or horizontal position, it may likewise be merely grasped and turned, in which case the housing 13 turns on the sections of the bushing. When it is desired to adjust the glare shield laterally, the handles 32 and 33 are merely pinched toward each other, disengaging the shoes from the track, thus enabling easy quick adjustment of the glare shield in all positions.

Various changes may be made in the details of construction without departing from the spirit or scope of the invention as defined by the appended claims.

I claim:

1. A glare shield comprising a track, a housing presenting a cylindrical interior surface and through which the track extends, a sectional bushing in the housing, one section of the bushing having a groove on its interior face for the reception of the track, said interior face having recesses, shoes disposed in the recesses, the other section of the bushing being grooved, an arcuate spring disposed therein having its ends engaging the shoes urging the shoes into engagement with the track and expanding the bushing in the housing, handles on the shoes, and a glare shield mounted on the housing.

2. A glare shield comprising a track, a housing presenting a cylindrical interior surface and through which the track extends, a sectional bushing in the housing, one section of the bushing having a groove on its interior face for the reception of the track, said interior face having recesses, shoes disposed in the recesses, the other section of the bushing being grooved, an arcuate spring disposed therein having its ends engaging the shoes urging the shoes into engagement with the track and expanding the bushing in the housing, handles on the shoes, and a glare shield mounted on the housing, the sections of the bushing having aligned opposed slots therein, a key in the slots having a laterally extending end adjacent the track, said key projecting through a circumferential slot in the housing and serving to hold the parts assembled and to limit rotational movement of the housing relatively to the bushing.

3. A glare shield comprising a track non-circular in cross section, a housing presenting a cylindrical interior surface and through which the track extends, a sectional bushing in the housing, one section of the bushing being grooved for reception of the track, track engageable means between the sections of the bushing, leaf spring means having its ends engaging and urging the track engageable means into engagement with the track and urging the bushing to expand in the housing, means for disengaging the track engageable means from the track, and a glare shield mounted for limited rotational movement on the housing.

4. A glare shield comprising a track, a housing presenting a cylindrical interior surface and through which the track extends, a sectional bushing in the housing, one section of the bushing having a groove on its interior face for the reception of the track, there being recesses at the ends of the sectional bushing, shoes disposed in the recesses engageable with the track, another section of the bushing being disposed in the groove, a spring bearing upon said other section having its ends engageable upon the shoes urging the shoes into engagement with the track, a key extending through slots in the sections of the bushing, said key having a portion fitting a circumferential slot in the housing and being recessed in said other part of the bushing beneath the spring.

5. A glare shield comprising a track, a housing presenting a cylindrical interior surface and through which the track extends, a sectional bushing in the housing, one section of the bushing having a groove on its interior face for the reception of the track, there being recesses at the ends of the sectional bushing, shoes disposed in the recesses engageable with the track, another section of the bushing being disposed in the groove, a spring bearing upon said other section having its ends engageable upon the shoes urging the shoes into engagement with the track, a key extending through slots in the sections of the bushing, said key having a portion fitting a circumferential slot in the housing and being recessed in said other part of the bushing beneath the spring, said key having a laterally extending portion disposed in a notch at the side edge of the spring.

In testimony whereof I have signed my name to this specification.

WILLIAM J. SUMMERBELL.